No. 770,567. PATENTED SEPT. 20, 1904.
W. H. DOUGLAS.
STEERING DEVICE.
APPLICATION FILED FEB. 20, 1904.
NO MODEL.
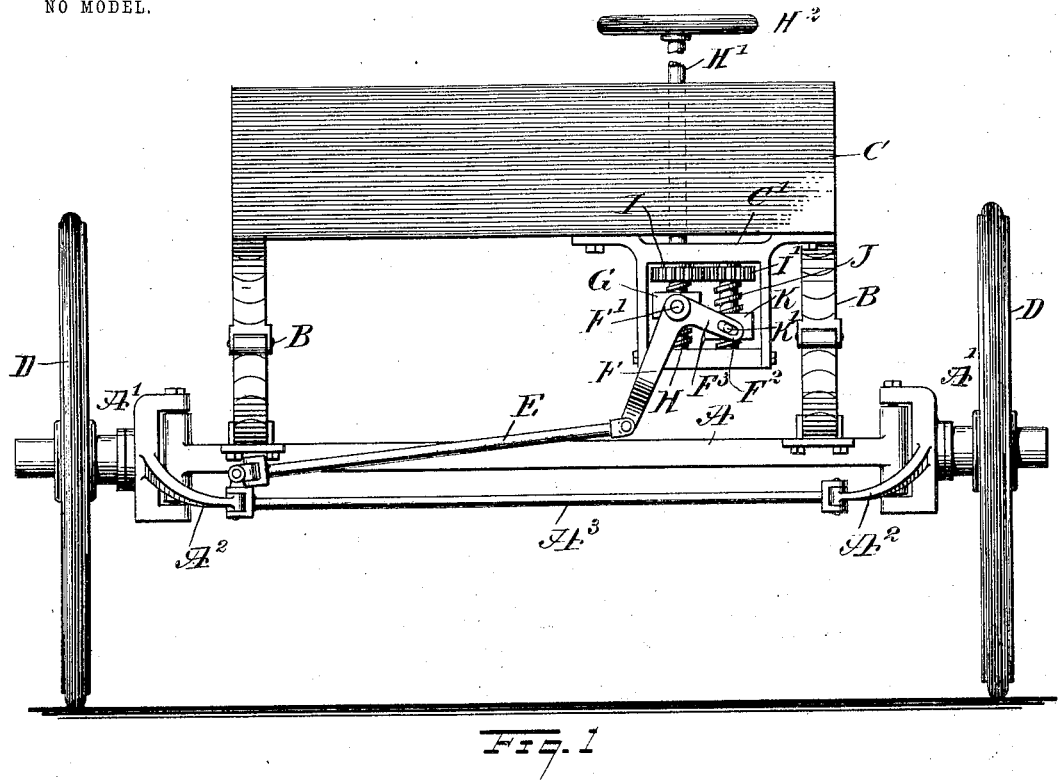
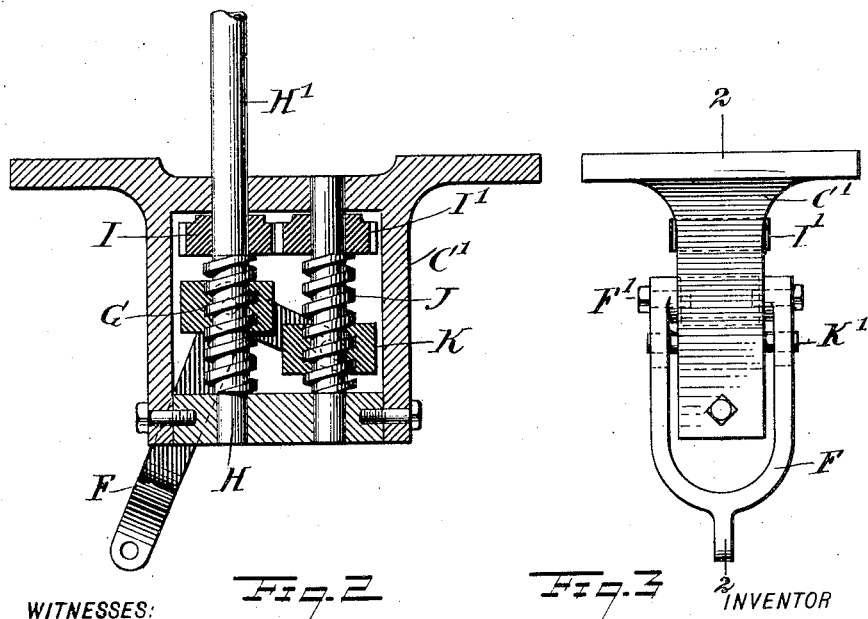
WITNESSES:
INVENTOR
William H. Douglas
BY
ATTORNEYS No. 770,567. Patented September 20, 1904.

UNITED STATES PATENT OFFICE.

WILLIAM HENRY DOUGLAS, OF BELLEVILLE, NEW JERSEY, ASSIGNOR TO HEALEY & COMPANY, OF NEW YORK, N. Y., A CORPORATION OF NEW JERSEY.

STEERING DEVICE.

SPECIFICATION forming part of Letters Patent No. 770,567, dated September 20, 1904.

Application filed February 20, 1904. Serial No. 194,523. (No model.)

*To all whom it may concern:*

Be it known that I, WILLIAM HENRY DOUGLAS, a citizen of the United States, and a resident of Belleville, in the county of Essex and State of New Jersey, have invented a new and Improved Steering Device, of which the following is a full, clear, and exact description.

This invention relates to automobiles and similar road-vehicles, aerial and marine vessels, and other mechanical conveyances requiring steering; and its object is to provide a new and improved steering device which can only be actuated from the steering-wheel, and when not required for steering purposes needs no attention or holding on the part of the operator, as it is locked in any position in which it is left and is not affected by jars or strains when the conveyance travels over rough roads, for instance, the steering device requiring but little power to actuate when it is desired to steer the conveyance.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a front elevation of the improvement as applied to a road-vehicle. Fig. 2 is an enlarged sectional front elevation of the improvement on the line 2 2 of Fig. 3, and Fig. 3 is a side elevation of the same.

The road-vehicle on which the improvement is shown applied in Fig. 1 is provided with a front axle A, connected by springs B with the vehicle-body C, and the axle A is provided with stub-axles A', carrying the front wheels D of the vehicle. The stub-axles A' are provided with arms $A^2$, connected with each other by a transverse link $A^3$, and this link is connected at one of its pivots by a link E with one arm of a bell-crank lever F, fulcrumed at F' on a nut G, in which screws a screw-rod H, journaled in suitable bearings arranged on a bracket C', secured to the under side of the vehicle-body C, as plainly illustrated in Fig. 1. From the screw-rod H extends a rod or shaft H', carrying a steering-wheel $H^2$ under the control of the operator, so that when the steering-wheel $H^2$ is turned the screw-rod H is rotated, so as to move the nut G up or down, according to the direction in which the steering-wheel $H^2$ is turned. On the screw-rod H is secured a spur-wheel I in mesh with a spur-wheel I', secured on a second screw-rod J, likewise journaled in the bracket C' and located parallel to the screw-rod H and somewhat spaced therefrom, and this screw-rod J screws in a nut K, having a pin K' engaging an elongated slot $F^2$ in the arm $F^3$ of the bell-crank lever F.

When the screw-rod H is turned in one direction, as above described, then the wheels I and I' impart a rotary motion to the screw-rod J in an opposite direction, and consequently while one nut travels upward on its screw-rod the other is forced to travel downward—that is, the nuts are caused to travel in opposite directions whenever the steering-wheel $H^2$ is turned. This traveling motion of the nuts G and K causes a swinging of the actuating-lever F, whereby the link E pulls or pushes on the link $A^3$ to cause a simultaneous swinging of the stub-axles A' relative to the front axle A to steer the vehicle in the desired direction. By the arrangement described the nuts G and K remain stationary unless the wheel $H^2$ is turned, and the said nuts are not liable to travel accidentally, and consequently it is not necessary for the operator to keep the hands on the steering-wheel $H^2$. Little force is required on the part of the operator to turn the steering-wheel $H^2$ to rotate the screw-rods H and J simultaneously and in opposite directions, and consequently a quick and reliable steering can be effected.

Having thus described my invention, I claim as new and desire to secure by Letters Patent—

1. The combination with a conveyance having a part or parts to be turned, of an operating-lever connected with the said part, a pair of screw-rods mounted to revolve in unison, and nuts traveling on the said screw-rods, on one of which the said operating-lever is fulcrumed, the operating-lever having a pivotal connection with the other nut, as set forth.

2. The combination with a conveyance having a part or parts to be turned, of an operating-lever connected with the said part, a pair of screw-rods geared together, to revolve in unison, one of the screw-rods being manually controlled, and nuts screwing on the said screw-rods, one of the nuts forming the fulcrum for the said operating-lever and the other nut being pivotally connected with the operating-lever, as set forth.

3. A mechanical movement comprising screw-rods mounted to revolve in unison, nuts traveling on the said screw-rods, and an opererating-lever fulcrumed on one of the nuts and pivotally connected with the other nut, as set forth.

4. A mechanical movement comprising screw-rods, of which one is manually controlled, gear-wheel connecting the screw-rods with each other, to rotate the screw-rods in unison and in opposite directions, nuts traveling on the said screw-rods, and an operating-lever fulcrumed on one of the nuts and pivotally connected with the other nut, as set forth.

5. The combination with a conveyance having a part or parts to be turned, of an operating-lever connected with the said part, revoluble members adapted to be turned in unison by the operator, and sliding members engaging the said revoluble members and caused to slide in opposite directions on turning the revoluble members, the sliding members being pivotally connected with the said lever.

6. The combination with a conveyance having a part or parts to be turned, of an operating-lever connected with the said part, revoluble members adapted to be turned in unison by the operator, and sliding members engaging the said revoluble members and caused to slide in opposite directions on turning the revoluble members, the said lever being fulcrumed on one of the sliding members and pivotally connected with the other sliding member.

7. A mechanical movement comprising revoluble members, adapted to be turned in unison, slidable members engaging the revoluble members and caused to slide in opposite directions on turning the revoluble members, and a lever fulcrumed on one of the sliding members and pivotally connected with the other sliding member.

In testimony whereof I have signed my name to this specification in the presence of two subscribing witnesses.

WILLIAM HENRY DOUGLAS.

Witnesses:
    THEO. G. HOSTER,
    EVERARD BOLTON MARSHALL.